US011791515B2

(12) United States Patent
Schreiber

(10) Patent No.: US 11,791,515 B2
(45) Date of Patent: Oct. 17, 2023

(54) BATTERY ASSEMBLY FOR AN AIRCRAFT

(71) Applicant: BETA AIR, LLC, South Burlington, VT (US)

(72) Inventor: Stuart Denson Schreiber, Essex, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/405,365

(22) Filed: Aug. 18, 2021

(65) Prior Publication Data

US 2023/0058402 A1 Feb. 23, 2023

(51) Int. Cl.
*H01M 50/249* (2021.01)
*H01M 50/211* (2021.01)
*H01M 10/613* (2014.01)
*H01M 10/647* (2014.01)
*H01M 10/625* (2014.01)

(52) U.S. Cl.
CPC ....... *H01M 50/249* (2021.01); *H01M 10/613* (2015.04); *H01M 10/625* (2015.04); *H01M 10/647* (2015.04); *H01M 50/211* (2021.01); *H01M 2220/20* (2013.01)

(58) Field of Classification Search
CPC ............. H01M 50/211; H01M 50/249; H01M 10/613; H01M 10/625; H01M 10/647
See application file for complete search history.

(56) References Cited

U.S. PATENT DOCUMENTS

| 2003/0091896 | A1 | 5/2003 | Watanabe et al. | |
| 2016/0226111 | A1* | 8/2016 | Blume | H01M 10/65 |
| 2017/0365894 | A1* | 12/2017 | Kwon | H01M 10/625 |
| 2019/0027795 | A1* | 1/2019 | Schoenherr | B60L 50/64 |
| 2019/0154761 | A1* | 5/2019 | Yoshida | H02J 7/0016 |
| 2020/0035981 | A1* | 1/2020 | Werner | H01M 50/20 |
| 2021/0021008 | A1* | 1/2021 | Mummigatti | B60L 50/64 |
| 2021/0126321 | A1 | 4/2021 | You et al. | |
| 2021/0175585 | A1 | 6/2021 | Lee | |
| 2021/0184290 | A1* | 6/2021 | Sweet | H01M 10/653 |
| 2021/0273302 | A1* | 9/2021 | Jin | H01M 50/519 |
| 2022/0115717 | A1* | 4/2022 | Kang | H01M 50/519 |

FOREIGN PATENT DOCUMENTS

| KR | 101715695 B1 | 3/2017 | | |
| KR | 20180091446 A | 8/2018 | | |
| WO | WO-2018099327 A1 * | 6/2018 | ......... | H01M 10/625 |
| WO | 2020116799 | 6/2020 | | |
| WO | WO-2021006586 A1 * | 1/2021 | ......... | H01M 10/653 |

* cited by examiner

*Primary Examiner* — Jonathan G Jelsma
(74) *Attorney, Agent, or Firm* — CALDWELL INTELLECTUAL PROPERTY LAW

(57) ABSTRACT

In an aspect, a battery assembly of an aircraft. A battery assembly is configured to include a first plurality of battery cells, a second plurality of battery cells, and an electrical bridging device. A top of each battery cell of first plurality of battery cells is coupled to a first side of an electrical bridging device. A top of each battery cell of a second plurality of battery cells is coupled to a second side of an electrical bridging device.

19 Claims, 7 Drawing Sheets

BATTERY ASSEMBLY FOR AN AIRCRAFT

FIELD OF THE INVENTION

The present invention generally relates to the field of battery assemblies in an aircraft. In particular, the present invention is directed to a battery assembly with an electrical bridging device.

BACKGROUND

Modern battery assemblies may be prone to overheating and may have limited electrical connections. Battery assemblies need an efficient way of distributing electrical connections to multiple battery cells while avoiding overheating.

SUMMARY OF THE DISCLOSURE

In an aspect, a battery assembly of an electric aircraft. A battery assembly is configured to include a first plurality of battery cells, a second plurality of battery cells, and an electrical bridging device. A top of each battery cell of first plurality of battery cells is coupled to a first side of an electrical bridging device. A top of each battery cell of a second plurality of battery cells is coupled to a second side of an electrical bridging device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
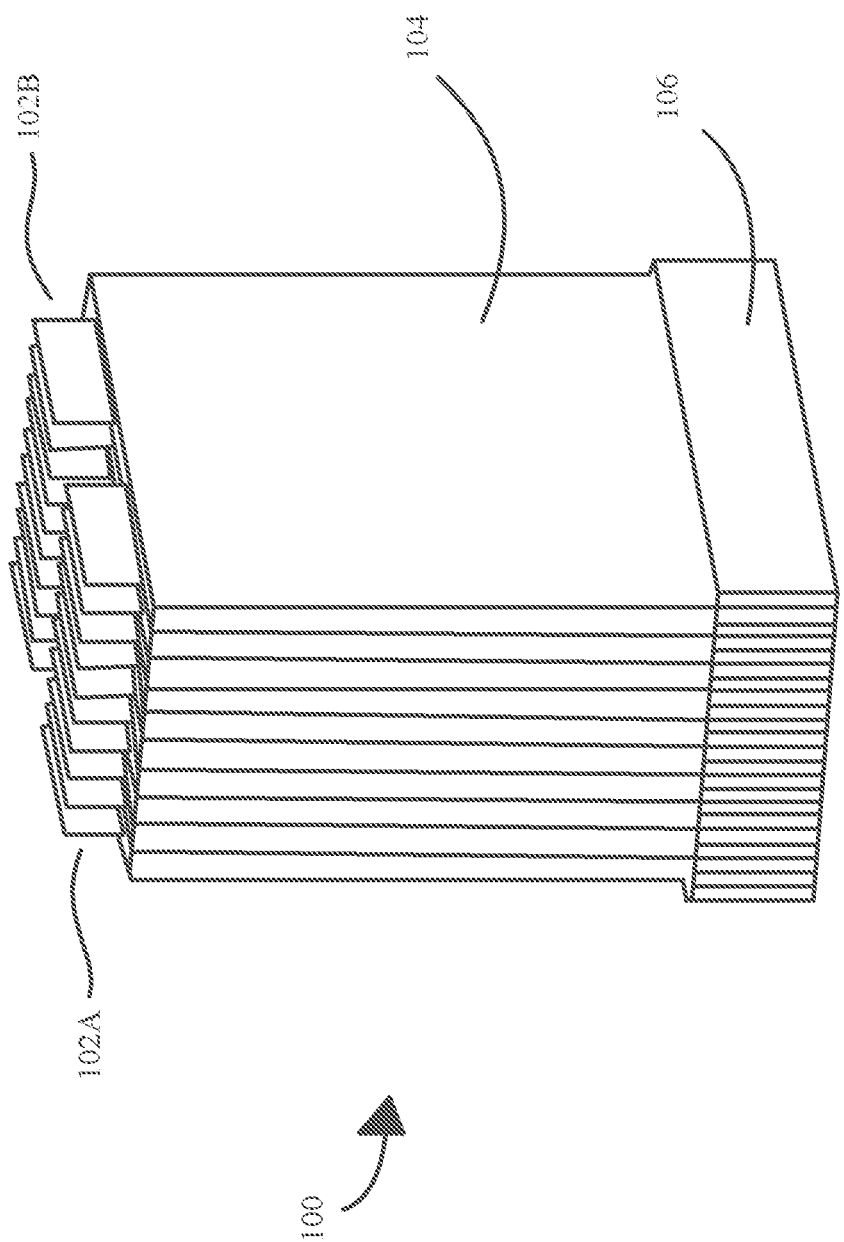
FIG. 1 is a front view of an exemplary embodiment of a battery pack.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a battery assembly of an aircraft. An aircraft may include an electric takeoff and landing vehicle (eVTOL). In some embodiments, a battery assembly may be coupled to an electric aircraft. In some embodiments, a battery assembly may be configured to include a first plurality of battery cells. A first plurality of battery cells may include lithium-ion battery cells. A first plurality of battery cells may include pouch cells. In some embodiments, a battery cell of a first plurality of battery cells may include a flexible casing. In some embodiments, a battery cell of a first plurality of battery cells may include conductive foil tabs. Conductive foils tabs may be configured to carry positive and negative terminals to an outside of a battery cell of a first plurality of battery cells. In some embodiments, conductive foil tabs may be wielded to an outside of a battery cell of a first plurality of battery cells. In some embodiments, a battery assembly may be configured to include a second plurality of battery cells. A second plurality of battery cells may include lithium-ion battery cells. A second plurality of battery cells may include pouch cells. In some embodiments, a battery cell of a second plurality of battery cells may include a flexible casing. In some embodiments, a battery cell of a second plurality of battery cells may include conductive foil tabs. Conductive foils tabs may be configured to carry positive and negative terminals to an outside of a battery cell of a second plurality of battery cells. In some embodiments, conductive foil tabs may be wielded to an outside of a battery cell of a second plurality of battery cells. In some embodiments, a battery assembly may be configured to include an electrical bridging device. An electrical bridging device may include a cooling element. In some embodiments, an electrical bridging device may be configured to carry an electrical current. In some embodiments, an electrical bridging device may be configured to be housed inside a first plurality of battery cells. In some embodiments, a top of each battery cell of a first plurality of battery cells may be coupled to a first side of an electrical bridging device. In some embodiments, a top of each battery cell of a second plurality of battery cells may be coupled to a second side of an electrical bridging device.

Referring now to FIG. 1, an illustration of an exemplary embodiment of a battery pack 100 is shown. A "battery pack" as used in this discourse is a structure configured to hold multiple electrochemical cells. In some embodiments, battery pack 100 may be made from a plurality of battery cells 104. A "battery cell" as used in this disclosure, is an electrochemical element that holds an electric potential. In some embodiments, plurality of battery cells 104 may be lithium-ion pouch cells. In some embodiments, battery pack 100 may be configured to hold 16 battery cells. In some embodiments, battery pack 100 may be configured to include any number of battery cells. In other embodiments, battery pack 100 may be configured to hold more or less than 16 battery cells. Battery pack 100 may include conductive foil tabs 102A-B. In some embodiments, conductive foil tabs 102A-B may be electrically connected to electrodes located inside a battery cell 104. In some embodiments, conductive foil tabs 102A-B may be sealed to an outside portion of a battery cell 104. An "outside portion" as used in this disclosure is an exterior surface of an object. Battery cells 104 in battery pack 100 may be electrically configured to connect to one another. In one embodiment, battery cells 104 of battery pack 100 may have an insulating barrier. In some embodiments, battery cells 104 of battery pack 100 may be configured in series and/or in parallel. In some embodiments, battery cells 104 may be positioned in one row in the battery pack 100. In other embodiments, battery cells 104 may be positioned in multiple rows in the battery pack 100. In some embodiments, battery cells 104 may be in a staggered arrangement in battery pack 100.

In some embodiments and still referring to FIG. 1, battery cells 104 may be disposed and/or arranged within a respective battery pack 100 in groupings of any number of columns and rows. In some embodiments, any two adjacent rows of battery cells 104 may be offset by a distance equal to a width or length of a battery cell 104. This arrangement of battery cells 104 is only a non-limiting example and in no way precludes other arrangement of battery cells. In some embodiments, battery cells 104 may be fixed in position by a battery cell retainer 106. Battery cells 104 may each include a cell configured to include an electrochemical reaction that produces electrical energy sufficient to power at least a portion of an electric aircraft. In some embodiments, battery cells 104 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 104 may use the term 'wired', but one of ordinary skill in the art would appreciate that this term is synonymous with 'electrically connected', and that there are many ways to couple electrical elements like battery cells 104 together. As an example, battery cells 104 may be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 104 may be wired in a series-parallel circuit which combines characteristics of the constituent circuit types to this combination circuit. Battery cells 104 may be electrically connected in any arrangement which may confer onto the system the electrical advantages associated with that arrangement such as high-voltage applications, high-current applications, or the like. In some embodiments, battery cell retainer 106 may employ a staggered arrangement to allow more battery cells 106 to be disposed closer together than in columns and rows like in a grid pattern. A staggered arrangement may also be configured to allow better thermodynamic dissipation. In other embodiments, cell retainer 106 may hold battery cells 104 in a square or grid-like pattern.

Figure 2:
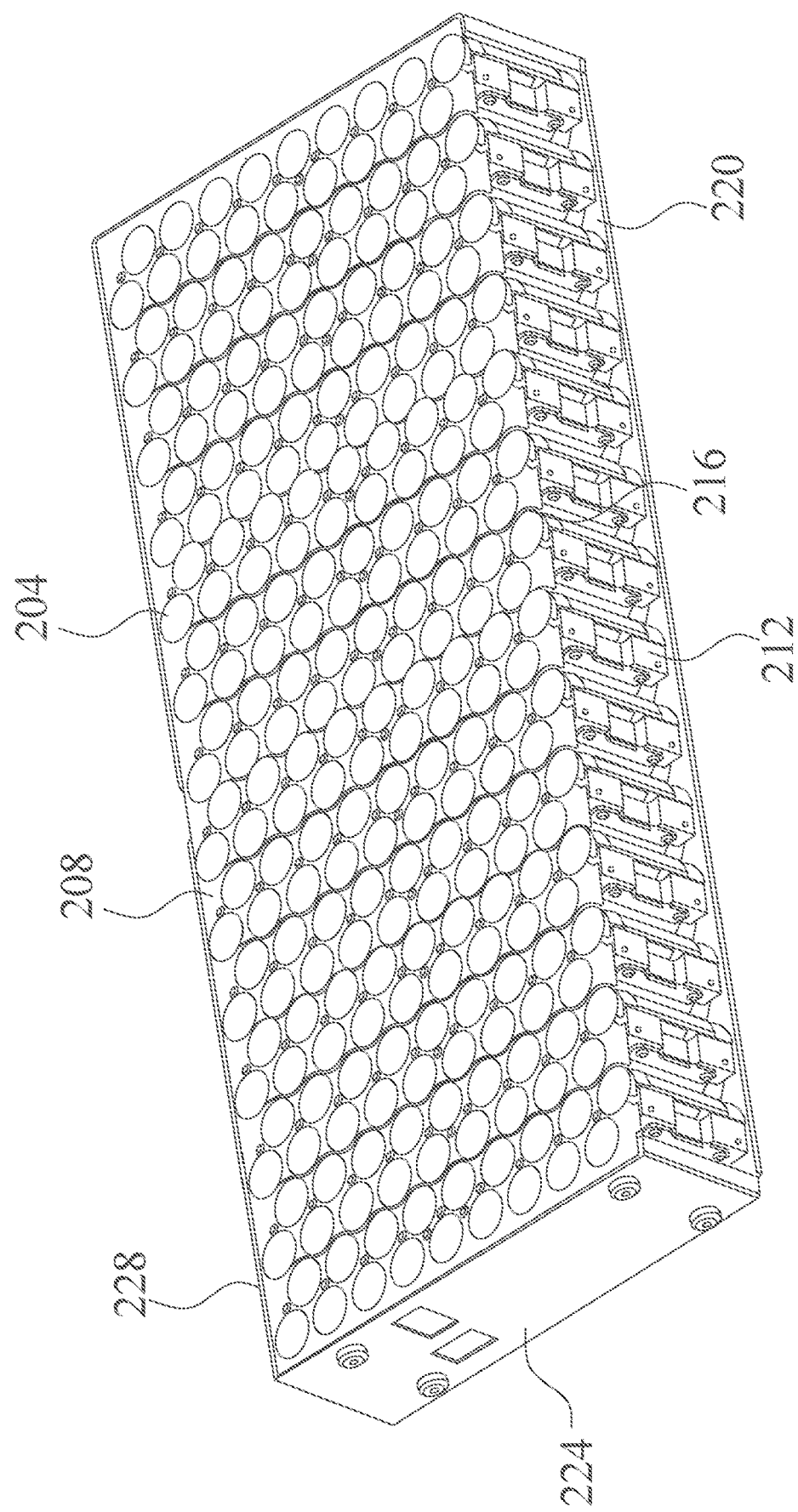
FIG. 2 is another front view of an exemplary embodiment of a battery pack.

Referring now to FIG. 2, an exemplary embodiment of a battery module 200 is illustrated. In embodiments, each circle illustrated represents a battery cell's circular cross-section. A battery cell, which will be adequately described below may take a plurality of forms, but for the purposes of these illustrations and disclosure, will be represented by a cylinder, with circles in representing the cross section of one cell each. With this orientation, a cylindrical battery cell has a long axis not visible in illustration. Battery cells are disposed in a staggered arrangement, with one battery unit comprising two columns of staggered cells. Each battery unit includes at least a cell retainer comprising a sheet of material with holes in a staggered pattern corresponding to the staggered orientation of cells. The cell retainer is the component which fixes battery cells in their orientation amongst the entirety of the battery module. A cell retainer also comprises two columns of staggered holes corresponding to the battery cells. There is a cell guide disposed between each set of two columns of battery cells underneath the cell retainer. The battery module can include a protective wrapping which weaves in between the two columns of battery cells contained in a battery unit.

With continued reference to FIG. 2, battery module 200 including sense board 204, side panel 208, end cap 212, electrical bridging device 216, and openings 220 are presented. In an embodiment, sense board 204 is illustrated in its entirety. Sense board 204 may comprise at least a portion of a circuit board that includes one or more sensors configured to measure the temperature of battery cells disposed within battery module 200. In embodiment, sensor board 204 may include one or more openings 220 disposed in rows and column on a surface of sense board 204. In embodiments, each hole may correspond to battery cells disposed within, encapsulated, at least in part, by battery units. For example, the location of each hole may correspond to the location of each battery cell disposed within battery module 200. According to embodiment, battery module 200 can include one or more side panels 208. Side panel 208 can include a protective layer of material configured to create a barrier between internal components of battery module 200 and other aircraft components or environment. Side panel 208 may comprise opposite and opposing faces that form a side of and encapsulate at least a portion of battery module 200. Side panel 208 may comprise metallic materials like aluminum, aluminum alloys, steel alloys, copper, tin, titanium, another undisclosed material, or a combination thereof. Side panel 208 may not preclude use of nonmetallic materials alone or in combination with metallic components permanently or temporarily coupled together. Nonmetallic materials that may be used alone or in combination in the construction of side panel 208 may comprise high density polyethylene (HDPE), polypropylene, polycarbonate, acrylonitrile butadiene styrene, polyethylene, nylon, polystyrene, polyether ether ketone, to name a few. Side panel 208 may be manufactured by a number of processes alone or in combination, including but limited to, machining, milling, forging, casting, 3D printing (or other additive manufacturing methods), turning, or injection molding, to name a few. One of ordinary skill in the art would appreciate that side panel 208 may be manufactured in pieces and assembled together by screws, nails, rivets, dowels, pins, epoxy, glue, welding, crimping, or another undisclosed method alone or in combination. Side panel 208 may be coupled to sense board 204, back plate, and/or end cap 212 through standard hardware like a bolt and nut mechanism, for example.

With continued reference to FIG. 2, battery module 200 may also comprise one or more end caps 212. End cap 212 may comprise a nonconductive component configured to align the back plate, sense board 204, and internal battery components of battery module 200 and hold their position. End cap 212 may form and end of and encapsulate a portion of a first end of battery module 200 and a second opposite and opposing end cap may form a second end and encapsulate a portion of a second end of battery module 200. End cap 212 may comprise a snap attachment mechanism further comprising a protruding boss which can configured to be captured, at least in part by a receptable of a corresponding size, by a receptacle disposed in or on the back plate. End cap 212 may employ a similar or same method for coupling itself to sense board 204, which may comprise a similar or the same receptacle. One or ordinary skill in the art would appreciate that the embodiments of a quick attach/detach mechanism end cap is only an example and any number of mechanisms and methods may be used for this purpose. It should also be noted that other mechanical coupling mechanisms may be used that are not necessarily designed for quick removal. Said mechanical coupling may include, as a non-limiting example, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. End cap 212 may comprise a nonconductive component manufactured from or by a process that renders it incapable or unsuitable for conveying electrical through, on, or over it. Nonconductive materials end cap 212 may comprise may be paper, Teflon, glass, rubber, fiberglass, porcelain, ceramic, quartz, various plastics like HDPE, ABS, among others alone or in combination. End cap 212 may comprise electrical bridging device 216. Electrical bridging device 216, for the purposes of this disclosure and in electrical parlance is any common connection to which any number of loads, which may be connected in parallel, and share a relatively similar voltage may be electrically coupled. Electrical bridging device 216 may refer to power busses, audio busses, video busses, computing address busses, and/or data busses. Electrical bridging device 216 may be responsible for conveying electrical energy stored in battery module 200 to at least a portion of an eVTOL aircraft. The same or a distinct electrical bridging device 216 may additionally or alternatively responsible for conveying electrical signals generated by any number of components within battery module 200 to any destination on or offboard an eVTOL aircraft. End cap 212 may comprise wiring or conductive surfaces only in portions required to electrically couple electrical bridging device 216 to electrical power or necessary circuits to convey that power or signals to their destinations. In some embodiments, battery module 200 may be as described in U.S. patent application Ser. No. 16/948,140, filed Sep. 4, 2020, and titled "SYSTEM AND METHOD FOR HIGH ENERGY DENSITY BATTER MODULE", of which is incorporated by reference herein in its entirety.

Figure 3:
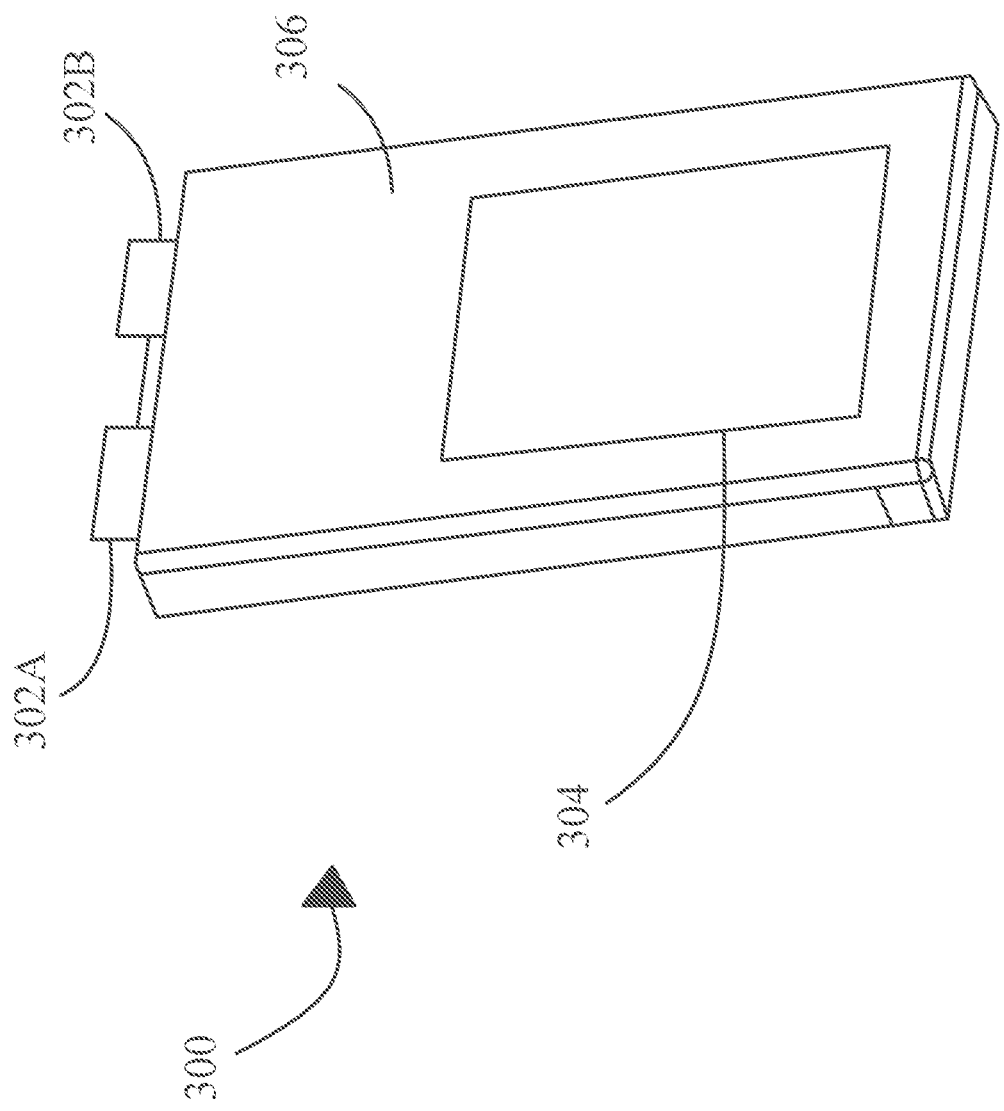
FIG. 3 is front view of an exemplary embodiment of a battery cell.

Referring now to FIG. 3, an exemplary embodiment of a battery cell 300 is illustrated. In some embodiments, battery cell 300 may include a pouch cell. As used in this disclosure, "pouch cell" is a battery cell or module that includes a pouch 304. In some cases, a pouch cell may include or be referred to as a prismatic pouch cell, for example when an overall shape of pouch is prismatic. In some cases, a pouch cell may include a pouch 304 which is substantially flexible. Alternatively or additionally, in some cases, a pouch 304 may be substantially rigid. In some cases, pouch 304 may include a polymer, such as without limitation polyethylene, acrylic, polyester, and the like. In some case, pouch 304 may be coated with one or more coatings. For example, in some cases, pouch 304 may have an outer surface. In some embodiments, the outer surface may be coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte may be located in pouch 304. In some cases, the electrolyte may comprise a liquid, a solid, a gel, a paste, and/or a polymer. In some embodiments, the electrolyte may be a lithium salt such as LiPF6. In some embodiments, the lithium salt may be lithium hexafluorophosphate, lithium tetrafluoroborate, lithium perchlorate, or other lithium salts. In some embodiments, the lithium salt may be in an organic solvent. In some embodiments, the organic solvent may be ethylene carbonate, dimethyl carbonate, diethyl carbonate or other organic solvents. In some embodiments, the electrolyte may wet or contact one or both of at least a pair of foil tabs Battery cell 300 may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cell 300 may include lead-based batteries such as without limitation lead acid batteries and lead carbon batteries. Battery cell 300 may include lithium sulfur batteries, magnesium ion batteries, and/or sodium ion batteries. Battery cell 300 may include solid state batteries or supercapacitors or another suitable energy source. In some embodiments, the battery cell 300 may be a pouch cell. In other embodiments, the battery cell 300 may be a prismatic, cylindrical, or other type of battery cell. In some embodiments, the battery cell 300 may be a lithium-ion battery. In some embodiments, the lithium-ion battery may include lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO). Persons skilled in the art, upon reviewing the entirety of this disclosure, will be aware of various devices of components that may be used as a battery cell.

In another embodiment, and still referring to FIG. 3, battery cell 300 may store electrical energy in the form of voltage. In some embodiments, battery cell 300 may include a cathode. In some embodiments, a cathode may include a copper current collector. In other embodiments, a cathode may include and/or be composed entirely or in part of a graphite active material. In yet another embodiment, the cathode may include and/or be composed entirely or in part of a binder such as carboxymethyl cellulose and styrene butadiene rubber. In still another embodiment, the cathode may include and/or be composed entirely or in part of a conductive carbon. In some embodiments, the cathode may be configured to collect electrons in the form of current. In some embodiments, the electrodes may include an anode. The anode may include and/or be composed entirely or in part of an aluminum foil current collector. In another embodiment, the anode may include and/or be composed entirely or in part of a metal oxide active material. In other embodiments, the anode may include and/or be composed entirely or in part of a binder such as polyvinylidene fluoride. In one embodiment, the anode may be a conductive carbon. In some embodiments, the anode of battery cell 300 may be configured to deliver electrons to an external load in the form of current.

Energy density, as used herein, is defined as the amount of energy stored in a given system or region of space per unit volume and colloquially, energy per unit mass (also known as "specific energy"), the units of which may be presented in Joules per kilogram (J/kg), kilocalories per gram (kcal/g), British Thermal Units per pound mass (BTU/lb), and in SI base units, meters squared per seconds squared ($m^2/s^2$), and for the purposes of this disclosure Watt hours per kilogram (Wh/kg). In some embodiments, and with further reference to FIG. 3, an energy density of battery cell 300 may be 150 Wh/kg. In some embodiments, an energy density of battery cell 300 may be greater than or less than 150 Wh/kg. In some embodiments, battery cell 300 may have a cell dimension of 140 mm by 8.5 mm by 240 mm. In other embodiments, battery cell 300 may have a cell dimension greater than or less than 140 mm by 8.6 mm by 240 mm. In some embodiments, battery cell 300 may have a voltage rating of between 1 and 10 volts. In one embodiment, battery cell 300 may have a voltage rating of 3.2 volts. In other embodiments, battery cell 300 may have a voltage rating of over 10 volts. In some embodiments, battery cell 300 may have a capacity of between 1 and 100 Ah. In one embodiment, the battery cell 300 may have a capacity of 25 Ah. In some embodiments, battery cell 300 may have a weight over 50 grams. In one embodiment, battery cell 300 may have a weight of less than 50 grams. In one embodiment, the battery cell 300 may have a weight of 530 grams.

Referring still to FIG. 3, in some embodiments, battery cell 300 may include a lithium-ion pouch cell. Battery cell 300 may include electrodes. Electrodes may include a positive electrode and a negative electrode. Each electrode of may include an electrically conductive element. Non-limiting exemplary electrically conductive elements include braided wire, solid wire, metallic foil, circuitry, such as printed circuit boards, and the like. Electrodes may be in electric communication with a pair of foil tabs 302A-B. Electrodes may be bonded in electric communication with pair of foil tabs 302A-B by any known method, including without limitation welding, brazing, soldering, adhering, engineering fits, electrical connectors, and the like. In some cases, pair of foil tabs 302A-B may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. In some embodiments, an anode may be double sided. In some embodiments, a cathode may be double sided. In some embodiments, an anode and a cathode may be stacked and wrapped in a separator. In some embodiments, an anode, cathode, and separator may be stacked and wrapped in a z-fold pattern. In other embodiments, an anode, cathode, and separator may be stacked and wrapped in a rectangular, square, or other pattern. In some embodiments, a cathode and an anode may be welded together, placing them in a series connection. In one embodiment, a cathode and an anode may be welded ultrasonically. In some embodiments, a cathode and an anode may be further welded to pair of foil tabs 302A-B. Pair of foil tabs 302A-B may be sealed to an outside portion of battery cell 300. An "outside portion" as used in this disclosure is an exterior surface of an object. An outside portion may be included in a first plurality of battery cells and/or a second plurality of battery cells. In some embodiments, pair of foil tabs 302A-B may be configured to connect to an external load or power source. In some embodiments, pair of foil tabs 302A-B may be configured to power an electric aircraft. In some embodiments, an electric aircraft may be an electric vertical takeoff and landing vehicle ("eVTOL"). In some embodiments, battery cell 300 may have a separator. In some embodiments, a separator may be an insulation layer. As used in this disclosure, an "insulator layer" is an electrically insulating material that is substantially permeable to battery ions, such as without limitation lithium ions. In some cases, insulator layer may be referred to as a separator layer or simply separator. In some cases, a separator may be configured to prevent electrical communication directly between pair of foil tabs 302A-B (e.g., cathode and anode). In some cases, a separator may be configured to allow for a flow ions across it. A separator may include a polymer, for example polyolefin (PO). A separator may comprise pours which are configured to allow for passage of ions, for example lithium ions. In some cases, pours of a PO separator may have a width no greater than 100 μm, 10 μm, or 0.1 μm. In some cases, a PO separator may have a thickness within a range of 1-100 μm, or 10-50 μm. Battery cell 300 may include an electrolyte. An electrolyte may be located within battery cell 300. In some cases, an electrolyte may include a liquid, a solid, a gel, a paste, and/or a polymer. In some embodiments, an electrolyte may be a lithium salt such as LiPF6. In some embodiments, a lithium salt may be lithium hexafluorophosphate, lithium tetrafluoroborate, lithium perchlorate, or other lithium salts. In some embodiments, a lithium salt may be in an organic solvent. In some embodiments, an organic solvent may be ethylene carbonate, dimethyl carbonate, diethyl carbonate or other organic solvents. An electrolyte may wet or contact one or both of at least a pair of foil tabs 302A-B.

Figure 4:
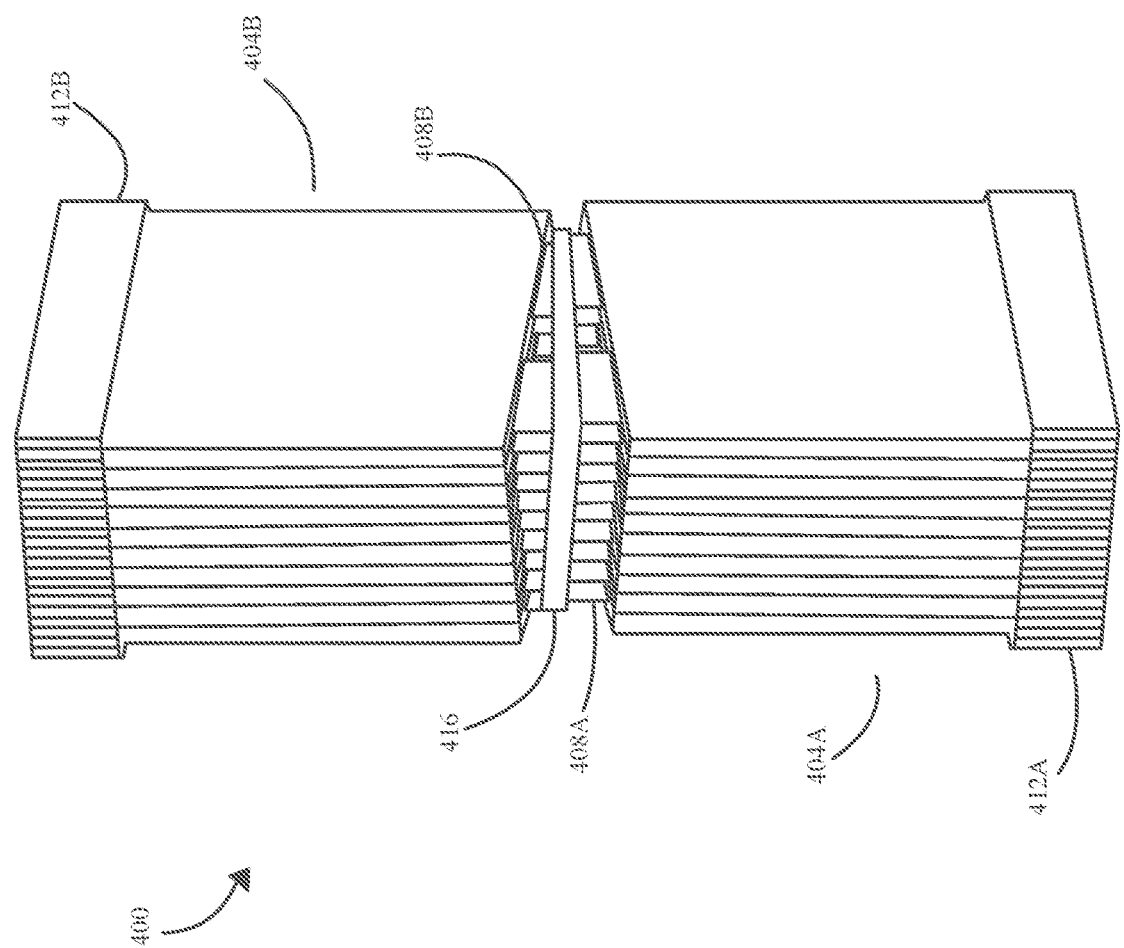
FIG. 4 is front view of an exemplary embodiment of a battery assembly.

Referring now to FIG. 4, an exemplary embodiment of a battery assembly 400 is shown. A "battery assembly" as used in this disclosure is a structure containing a plurality of battery packs. Battery assembly 400 may include battery packs 404A-B. Battery packs 404A-B may include a plurality of battery cells. In some embodiments, a plurality of battery cells may include lithium-ion battery cells. In some embodiments, battery packs 404A-B may include battery cell retainer 412A-B. In some embodiments, battery packs 404A-B may include pair of conductive foil tabs 408A-B. In some embodiments, battery assembly 400 may include electrical bridging device 416. An "electrical bridging device" as used in this disclosure, is a component including a metallic strip or bar configured for local high current power distribution. In some embodiments, electrical bridging device 416 may include a busbar. In some embodiments, electrical bridging device 416 may include a shape. A shape may include, but is not limited to, a rectangular, hexagonal, circular, square, triangular, and/or other shapes. In some embodiments, electrical bridging device 416 may include a flat, bar, and/or rod shape. Electrical bridging device 416 may include a conductive element. A conductive element may include copper, brass, aluminum, and/or other conductive elements. In some embodiments, electrical bridging device 416 may include a flexible material. In other embodiments, electrical bridging device 416 may include a rigid material. In some embodiments, electrical bridging device 416 may be configured to include a curved structure. In some embodiments, electrical bridging device 416 may include a plurality of curved structures. In some embodiments, electrical bridging device 416 may include a braided structure. A braided structure may include a plurality of conductive wires that may be wrapped into a single braid. A braided structure may allow for a flexibility of electrical bridging device 416. In some embodiments, electrical bridging device 416 may include a laminated structure. Electrical bridging device 416 may include a plurality of layers. In a non-limiting example, electrical bridging device 416 may include a structural frame surrounding a plurality of thin conductor layers.

Still referring to FIG. 4, electrical bridging device 416 may be configured to carry an electrical current from battery pack 404A to battery pack 404B. In some embodiments, electrical bridging device 416 may be configured to carry an electrical current from battery pack 404B to battery pack 404A. In some embodiments, electrical bridging device 416 may be configured to connect to another electrical component external to battery assembly 400. In some embodiments, battery assembly 400 may include a plurality of electrical bridging devices 416. In some embodiments, battery packs 404A-B may be configured to house electrical bridging device 416. In other embodiments, electrical bridging device 416 may be configured to connect to a side of battery pack 404A-B. In some embodiments, electrical bridging device 416 may be configured to couple to a first side of battery packs 404A-B. A "first side" as used in this disclosure, is an initial contact point between an electrical bridging device and a battery pack. In some embodiments, electrical bridging device 416 may be configured to couple to a second side of battery packs 404A-B. A "second side" as used in this disclosure is a surface opposite a first contact point of an electrical bridging device and a battery pack. In some embodiments, a plurality of electrical bridging devices may connect each individual battery cell of battery pack 404A to each individual battery cell of battery pack 404B. In some embodiments, electrical bridging device may be configured to connect each tab of conductive In some embodiments, electrical bridging device 416 may be configured to provide an "electrical joint" at various points along battery assembly 400. An "electrical joint" as used in this disclosure, is a point in a circuit in which current and/or voltage may be shared with an external electrical component. In some embodiments, an electrical joint may include a power distribution component. A power distribution component may include a component in electrical communication with electrical bridging device 416 that may allow for further external connections to other electrical components. An external electrical component may include a busbar, a circuit, a ground terminal, or other electrical components. In a non-limiting example, a power distribution component may be placed on a top side of electrical bridging device 416. A power distribution unit may be configured to provide an external electrical communication from a top side of electrical bridging device 416. In other embodiments, a power distribution unit may be configured to provide an external electrical communication from a rear, bottom, left, and/or right side of electrical bridging device 416. In some embodiments, electrical bridging device 416 may include a coating. A coating may be configured to allow a greater ampacity of electrical bridging device 416. An "ampacity" may include a maximum current carrying capacity of electrical bridging device 416. Ampacity may be measured in amps. In some embodiments, a coating may include tin, silver, copper, and/or other coating elements.

In some embodiments, and with continued reference to FIG. 4, electrical bridging device 416 may be configured to electrically connect conductive foil tabs 408A to conductive foil tabs 408B. Electrical bridging device 416 may connect battery pack 404A to battery pack 404B in a series and/or parallel connection. In some embodiments, electrical bridging device 416 may connect a plurality of battery packs in a plurality of series connections, parallel connections, and/or combination thereof. In some embodiments, electrical bridging device 416 may be configured to connect a plurality of conductive foil tabs together. In some embodiments, electrical bridging device 416 may surround each tab of conductive foil tabs 408A-B.

In some embodiments, and with continued reference to FIG. 4, electrical bridging device 416 may include a cooling element. A "cooling element" as used in this disclosure, is an element that aids in a reduction of a thermal energy of a battery pack. A thermal energy may include a heat that may be measured in Fahrenheit (° F.), Celsius (° C.), or Kelvin (° K). In some embodiments, a cooling element may include a venting system. A venting system may include a fan that may be configured to allow a flow of air. In some embodiments, a venting system may include a plurality of fans. In some embodiments, a venting system may include a structured pathway that may be configured to passively direct heat away from battery assembly 400. In other embodiments, a cooling element may include a liquid cooling system. A liquid cooling system may include a pathway configured to allow a liquid to flow through the pathway. A liquid may include, but is not limited to, water, ethylene glycol, propylene glycol, mineral water, and/or other liquids. A liquid cooling system may be configured to direct a flow of liquid through electrical bridging device 416 that may allow for a reduction in temperature of electrical bridging device 416. In other embodiments, a liquid cooling system may be configured to allow a liquid to flow throughout battery assembly 400 in a structured pathway. In some embodiments, a cooling element may include a heat sink. In other embodiments, a cooling element may include a thermal paste. Electrical bridging device 416 may be configured to cool battery assembly 400. In some embodiments, electrical bridging device 416 may be configured to include a plurality of holes. A plurality of holes may assist in a venting and/or cooling of battery assembly 400. In other embodiments, a plurality of holes may be configured to hold a cold plate. A cold plate may include a plate configured to transfer a heat away from electrical bridging device 416 and to a fluid. In some embodiments, electrical bridging device 416 may include a layered structure that may include a water cooling system sandwiched between a plurality of layers. In a non-limiting example, electrical bridging device 416 may include a serpentine like structure of interior liquid cooling pathways surrounded by a conductive exterior element. In other embodiments, a structure of an interior liquid cooling pathway may include a rectangular, square, triangular, circular, or other structure. In some embodiments, electrical bridging device 416 may include one or more cooling vanes. A "cooling vane" as used in this disclosure is a thin conductive element that is configured to direct heat away from a heat source. In some embodiments, a cooling vane may be configured to extend to a surface area of electrical bridging device 416. In some embodiments, a cooling vane may be configured to be utilized with air cooling and/or radiative cooling systems. In some embodiments, electrical bridging device 416 may include one or more heat pipes. A "heat pipe" as used in this disclosure is a heat transfer device that combines thermal conductivity and phase transition to transfer heat between two solid interfaces. In some embodiments, a heat pipe may include a liquid that may be in contact with a thermally conductive solid. A liquid may turn into vapor by absorbing heat from a thermally conductive solid. A vapor may travel along a heat pipe to a cold interface. A cold interface may be configured to condenses a vapor into a liquid which may release latent heat of the vapor. A liquid may return to a hot interface by a number of means, such as, but not limited, capillary action, centrifugal force, and/or gravity.

Still referring to FIG. 4, in some embodiments electrical bridging device 416 may be configured to prevent a current overload of battery assembly 400. A "current overload" may include a current excessive relative to a normal operating current. A current overload may damage electrical components of battery assembly 400. In some embodiments, electrical bridging device 416 may be configured to include a shunt. A "shunt" as used in this disclosure is an electrical component that creates a low resistance path for electric current to allow the current to pass around another point in a circuit. In some embodiments, electrical bridging device 416 may include a plurality of shunts. In some embodiments, electrical bridging device 416 may include a fuse and/or circuit breaker. Electrical bridging device 416 may include a sensor. In some embodiments, electrical bridging device 416 may include a plurality of sensors. A sensor may include but is not limited to, a temperature, voltage, current, pressure, humidity, or other sensor. A sensor of electrical bridging device 416 may be configured to determine a maximum temperature threshold of battery packs 404A-B. In a non-limiting example, electrical bridging device 416 may detect a temperature about a maximum temperature threshold of battery pack 404A. Electrical bridging device 416 may disconnect battery pack 404A from battery pack 404B in order to prevent further overheating. In some embodiments, electrical bridging device 416 may be configured to include a connection mechanism. A connection mechanism may include an electromechanical switch. Electrical bridging device 416 may utilize an electromechanical switch to disconnect itself from battery pack 404A-B.

Still referring to FIG. 4, electrical bridging device 416 may include a controller area network bus. A "controller area network bus," as used in this disclosure, is vehicle bus unit including a central processing unit (CPU), a CAN controller, and a transceiver designed to allow devices to communicate with each other's applications without the need of a host computer. A controller area network (CAN) bus unit may include physical circuit elements that may use, for instance and without limitation, twisted pair, digital circuit elements/FPGA, microcontroller, or the like to perform, without limitation, processing and/or signal transmission processes and/or tasks; circuit elements may be used to implement CAN bus components and/or constituent parts as described in further detail below. A CAN bus unit may include multiplex electrical wiring for transmission of multiplexed signaling. A CAN bus unit may include message-based protocol(s), wherein the invoking program sends a message to a process and relies on that process and its supporting infrastructure to then select and run appropriate programing. A plurality of CAN bus units may be located at electrical bridging device 416.

Still referring to FIG. 4, electrical bridging device 416 may include a plurality of controller area network gateways communicatively connected to a plurality of physical controller area network buses, wherein the plurality of controller area network gateways are configured to transmit a plurality of data. A "controller area network gateway," as used in this disclosure, is a piece of networking hardware used for transmission of data signals from one discrete network to another. A CAN gateway may include routers and/or switches which may provide interoperability between physical CAN bus units communicatively connected with switches, such as Ethernet switches, wherein the intraoperatively may include the transmission of data between battery assembly 400 and the Ethernet switch. A CAN gateway may include internet protocol (IP) network gateways, internet-to-orbit gateways, cloud storage gateways, internet-of-things (IoT) gateways, network switch, among other devices.

Continuing in reference to FIG. 4, battery assembly 400 may include at least a network switch communicatively connected to the plurality of controller area network gateways configured to receive the transmitted measured state data and transmit the measured state data via a transmission signal. A "network switch," as used in this disclosure, is a networking hardware that connects devices on a computer network using packet switching to receive and forward data to a destination device. A network switch may include an Ethernet hub switch, which may be used for Fiber Channel, Asynchronous Transfer Modes, and/or InfiniBand. A "transmission signal," as used in this disclosure, is a transmitted analogue and/or digital signal originated from a physical CAN bus unit. A transmission signal may include data.

Continuing in reference to FIG. 4, a transmission signal may include Ethernet transmission signal. An "Ethernet transmission signal," as used in this disclosure, is an analogue and/or digital signal transmitted using functionality of the Ethernet family of computer network standards. An ethernet transmission signal may be generated by and/or from a network switch, wherein signals received by the network switch from a CAN gateway may be transmitted as an Ethernet transmission signal from the network switch; transmission may include multiplexing, for instance and without limitation by way of a multiplexor, and/or selection by some logic at a network switch. A network switch may include a physical layer defining the electrical and/or optical properties of the physical connection between a device, such as a CAN gateway, and a network. A transmission signal of data originating from a physical CAN bus unit may be transmitted to a virtual CAN bus, and/or virtual CAN bus unit, as described in further detail below, as an Ethernet-transmissible signal. Data may be signaled to a virtual bus via a wireless, wired, optical, or other connection, and/or an Ethernet connection; virtual bus unit may correspondingly transmit back to a physical CAN bus unit back through a network switch using any such media of transmission. Transmitting back may include, for instance and without limitation, transmitting a control message to remotely alter a state of aircraft, as described in further detail below.

Continuing in reference to FIG. 4, transmission signal may include radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. A radio frequency (RF) transmission signal may compose analogue and/or digital signal received, from instance via a network gateway and transmitted using functionality of output power of radio frequency from a transmitter to an antenna, and/or any RF receiver. A RF transmission signal may use longwave transmitter device for transmission of signals. A RF transmission signal may include a variety of frequency ranges, wavelength ranges, ITU designations, and IEEE bands including HF, VHF, UHF, L, S, C, X, Ku, K, Ka, V, W, mm, among others. A radio frequency transmission signal may be generated by and/or from a network switch. Signals received by a network switch from a CAN gateway may be transmitted, for instance and without limitation as multiplexed by way of a multiplexor and/or selected by some logic at the network switch, as a radio frequency transmission signal from the network switch. A network switch may include a physical layer defining electrical and/or optical properties of a physical connection between a device, such as a CAN gateway, and a communication device such as without limitation a radiating antenna used to convert a time-varying electric current into an electromagnetic wave or field. In a non-limiting example, transmission signal of measured state data originating from a physical CAN bus unit may be transmitted to a virtual CAN bus, and/or virtual CAN bus unit, as a radio wave-transmissible signal. Data may be signaled to a virtual bus via a transmitting antenna and/or encoder and received by a receiving antenna and/or receiver at bus unit; transmission may be relayed by one or more intervening devices such as network hubs and/or nodes, satellites, or the like. A radio frequency signal transmission may be sent to a virtual bus unit and the virtual bus unit may correspondingly transmit back to a physical CAN bus unit through a network switch. Transmitting back may include, for instance and without limitation, transmitting a control message to remotely alter a state of an aircraft, as described in further detail below.

Continuing in reference to FIG. 4, a network switch may be further configured to multiplex the plurality of measured state data 108 messages from a plurality of physical CAN bus units into a single incoming transmission signal. A "single incoming transmission signal," as used in this disclosure, is a multiplexed transmission signal including a plurality of data transmission signals originating from a plurality of physical CAN bus units. A single transmission signal may include a plurality of Ethernet transmission signals from a plurality of network gateways. A single transmission signal may include a plurality of RF transmission signals from a plurality of network gateways. Multiplexing may include any method by which multiple analogue and/or digital signals are combined into one signal over a shared medium. For instance and without limitation, multiplexing may include receiving a plurality of inputs and choosing, or selecting, which input to send as an output from a multiplexor based on control inputs to the multiplexor. Multiplexing may include analogue modulation, such as amplitude modulation (AM), frequency modulation (FM), phase modulation (PM), quadrature amplitude modulation (QAM), space modulation (SM), single-sideband modulation (SSB), and the like. Multiplexing may include circuit mode modulation, including time-division multiplexing (TDM), frequency-division multiplexing (FDM), wavelength-division multiplexing (WDM), space-division multiple access (SDMA), polarization-division multiplexing (PDM), spatial multiplexing, and the like. Multiplexing may include statistical multiplexing, including packet switching, dynamic time-division multiple access (TDMA), frequency-hopping spread spectrum (FHSS), and the like. Multiplexing may be performed by a multiplexer such as any programmable logic device which selects between several analog and/or digital input signals and forwards the selected inputs to a single output line. A network switch may include multiplexor and/or may act as a multiplexer for receiving, for instance and without limitation, multiple Ethernet-based transmission signals and package the transmission into a single output to transmit via Ethernet transmission to a virtual CAN bus.

Continuing in reference to FIG. 4, battery assembly 400 may include a virtual controller area network bus unit configured to receive the transmission signal originating from the at least a network switch. A "virtual controller area network bus unit," as used in this disclosure, is a device including a central processing unit (CPU), CAN controller, and transceiver, which receives a transmission signal and virtually recapitulate the status, behavior, and/or data of and/or originating from a physical CAN bus unit. A virtual CAN bus unit may include any physical circuit elements suitable for use in physical CAN bus unit as described above. A virtual CAN bus unit may include a multiplexor, multiplexing logic, and/or multiplex electrical wiring for transmission of multiplexed signaling to a network switch. A virtual CAN bus unit may include message-based protocol (s), wherein the invoking program sends a message to a process and relies on that process and its supporting infrastructure to then select and run appropriate programing. A virtual CAN bus unit may include a computing device, as described in further detail below. A virtual CAN bus unit may include a computer, "smartphone", IoT device, tablet computer, among other devices with capability described herein. Virtual CAN bus unit 132 may receive a transmission signal including data. A virtual CAN bus unit may receive a transmission signal as an Ethernet transmission signal and/or RF transmission signal. A virtual CAN bus unit may include a virtual machine, which operates as an emulation of a computer system, providing functionality of a physical computer. A virtual CAN bus unit may include any device herein configured to demultiplex signal, store to disc, transmit signals to other device, and/or send back to flight CAN(s).

Continuing in reference to FIG. 4, a virtual CAN bus unit may be configured to demultiplex a single incoming transmission signal into a plurality of outgoing messages originating from the plurality of physical controller area network buses. An "outgoing message," as used in this disclosure, is a demultiplexed transmission signal which originated as part of the single incoming transmission signal. Outgoing message may include a plurality of data, and/or discrete portions thereof. An outgoing message may include analogue and/or digital transmission signals, including an Ethernet transmission signal and/or RF transmission signal. Demultiplexing is a process of reconverting a single transmission signal containing the multiple analogue and/or digital signal streams from a plurality of network gateways back into the original separate and unrelated signals originally relayed from physical CAN bus units. Demultiplexing may include extracting the original channels on the receiving end to identify which physical CAN bus unit a signal originates from. Demultiplexing may be performed using a demultiplexer such as a binary decoder, or any programmable logic device. Demultiplexing may be performed using a computing software operating on a virtual CAN bus unit, which may deconvolute a single transmission signal. Alternatively or additionally, a virtual CAN bus unit may be configured to communicatively connect to each controller area network gateway of the plurality of controller area network gateways. A virtual CAN bus unit may receive signal transduction directly from CAN network gateways, circumventing the need for multiplexing.

Continuing in reference to FIG. 4, a virtual CAN bus unit may be configured to bridge a plurality of virtual controller area network bus units to the plurality of physical controller area network bus units. A "plurality of virtual controller area network bus units," as used in this disclosure, is at least a second virtual CAN bus unit aside from a first virtual CAN bus unit which originally received a single transmission signal. A plurality of virtual controller area network bus units may include any capability as described for a virtual CAN bus unit herein. A network bridge may include a computer networking device that creates a single, aggregate network from multiple communication networks or network segments. Network bridging is distinct from routing. Routing may allow multiple networks to communicate independently and yet remain separate, whereas bridging may connect two separate networks as if they were a single network. In this way, a virtual CAN bus unit may transmit the demultiplexed outgoing messages to a plurality of virtual CAN bus units which may operate as if they were all part of the same virtual machine. Bridging may include any type of network bridging technology, such as simple bridging, multiport bridging, and learning or transparent bridging. A virtual CAN bus unit may perform bridging using a forwarding information base stored in content-addressable memory (CAM), wherein for each received ethernet frame, a virtual CAN bus unit may learn from the frame's source MAC address and add this together with an interface identifier to the forwarding information base. A virtual CAN bus unit may then forward the frame to the interface found in the CAM based on the frame's destination MAC address. If the destination address is unknown the switch sends the frame out on all interfaces (except the ingress interface). This process is oftentimes referred to unicast flooding. Once a bridge learns the addresses of its connected nodes, it may forward data link layer frames using a layer-2 forwarding method. There are several forwarding methods a bridge can use, for instance and without limitation, store and forward, cut through, fragment free, and adaptive switching, of which some methods are performance-increasing methods when used on "switch" products with the same input and output port bandwidths.

Continuing in reference to FIG. 4, bridging may include using any device that is capable for communicating with a virtual CAN bus unit, computing device, or able to receive data, retrieve data, store data, and/or transmit data, for instance via a data network technology such as 3G, 4G/LTE, 5G, Wi-Fi, IEEE 802.11 family standards, IEEE 802.1aq standards, and the like. For instance and without limitation, Shortest Path Bridging (SPB), specified in the IEEE 802.1aq standard, is a computer networking technology intended to simplify the creation and configuration of networks, while enabling multipath routing. It may include a proposed replacement for Spanning Tree Protocol (SPB) which blocks any redundant paths that could result in a layer 2 loop. SPB may allow all paths to be active with multiple equal-cost paths. SPB may also increase the number of VLANs allowed on a layer-2 network. Bridging between devices may also include devices that communicate using other mobile communication technologies, or any combination thereof, for instance and without limitation, short-range wireless communication for instance, using Bluetooth and/or Bluetooth LE standards, AirDrop, near-field (NFC), and the like. Bridging between devices may be performed using any wired, optical, or wireless electromagnetic transmission medium, as described herein.

Continuing in reference to FIG. 4, bridging a plurality of virtual controller area network bus units to a plurality of physical CAN bus units may include transmitting at least a control message of a plurality of control messages originating from at least a virtual controller network bus of the plurality of virtual controller network buses to a physical CAN bus unit of a plurality of physical CAN bus units. A "control message," as used in this disclosure, is a transmission signal that is intended to control a device that is considered at a physical CAN bus and/or communicated therewith.

Figure 5:
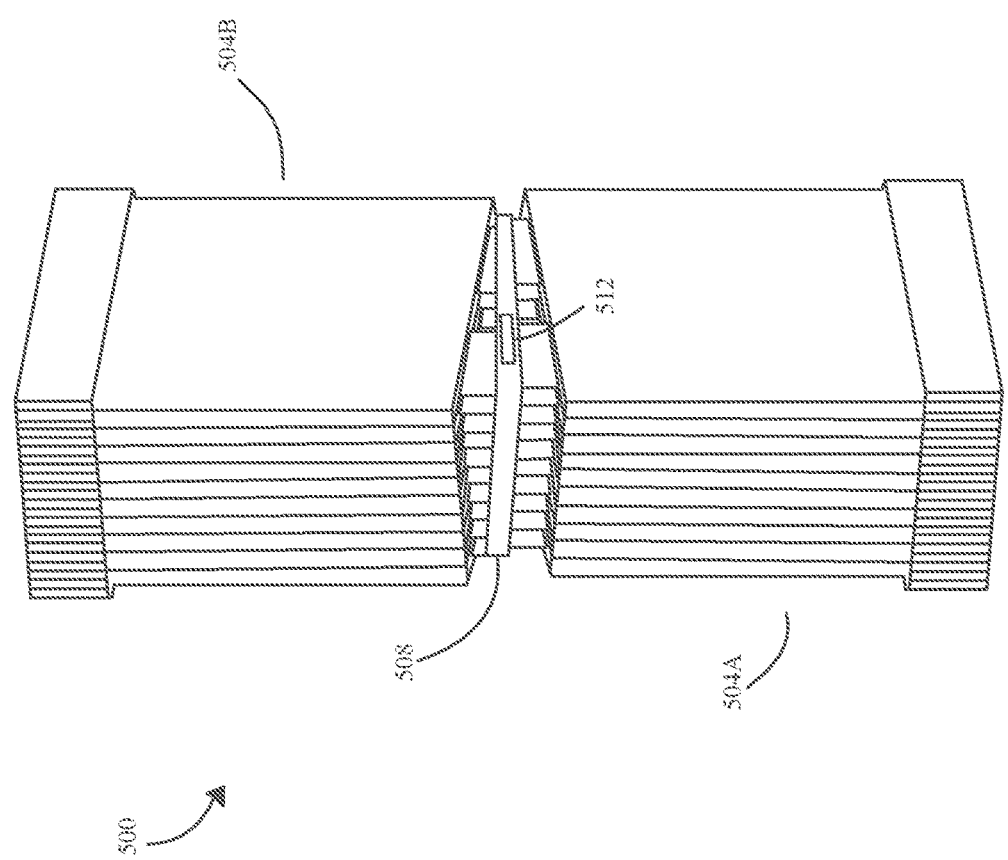
FIG. 5 is front view of an exemplary embodiment of a battery assembly with a sensor board.

Referring now to FIG. 5, an illustration of an exemplary embodiment of a sense board 516 connected to electrical bridging device 508 is shown. In some embodiments, sense board 508 may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may include a psychrometer. A moisture sensor may include a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, sense board 516 may include electrical sensors. Electrical sensors may be configured to measure voltage across a component, electrical current through a component, and resistance of a component. Electrical sensors may include separate sensors to measure each of the previously disclosed electrical characteristics such as voltmeter, ammeter, and ohmmeter, respectively. Alternatively or additionally, sensor board 516 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sense board and/or a control circuit incorporated therein and/or communicatively connected thereto may be configured to adjust charge to one or more battery cells as a function of a charge level and/or a detected parameter. For instance, and without limitation, sensor board 516 may be configured to determine that a charge level of a battery cell of battery packs 504A-B is high based on a detected voltage level of that battery cell or portion of the battery pack. Sense board 516 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sense board 516 may include digital sensors, analog sensors, or a combination thereof. Sense board 516 may include digital-to-analog converters (DAC), analog-to-digital converters (ADC, A/D, A-to-D), a combination thereof, or other signal conditioning components used in transmission of a plurality of battery pack data 508 to a destination over wireless or wired connection.

With continued reference to FIG. 5, sense board 516 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 500, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 5, sense board 516 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sense board 508, may be configured to detect combustible, flammable, toxic, oxygen depleted, a combination thereof, or another type of gas alone or in combination. The gas sensor that may be present in sense board 508 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sense board 508 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sense board 508 may include sensors that are configured to detect non-gaseous byproducts of cell failure including, in non-limiting examples, electrical anomalies as detected by any of the previous disclosed sensors or components.

With continued reference to FIG. 5, sense board 516 may be configured to detect events where voltage nears an upper voltage threshold or lower voltage threshold. The upper voltage threshold may be stored in a data storage system for comparison with an instant measurement taken by any combination of sensors present within sense board 516. The upper voltage threshold may be calculated and calibrated based on factors relating to battery cell health, maintenance history, location within battery pack, designed application, and type, among others. Sense board 508 may measure voltage at an instant, over a period of time, or periodically. Sense board 508 may be configured to operate at any of these detection modes, switch between modes, or simultaneous measure in more than one mode. Sense board 516 may detect through a sensor events where voltage nears the lower voltage threshold. The lower voltage threshold may indicate power loss to or from an individual battery cell or portion of the battery pack. Sense board 508 may detect through a sensor events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

In some embodiments, sense board 516 may be integrated into electrical bridging device 508. In some embodiments, a plurality of sense boards may be integrated to a battery pack of battery packs 504A-B. In some embodiments, sense board 516 may sense a characteristic as an analog measurement, for instance, yielding a continuously variable electrical potential indicative of the sensed characteristic. In these cases, sense board 508 may additionally comprise an analog to digital converter (ADC) as well as any additionally circuitry, such as without limitation a Whetstone bridge, an amplifier, a filter, and the like. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 500 measuring temperature, electrical characteristic such as voltage, amperage, resistance, or impedance, or any other parameters and/or quantities as described in this disclosure.

In some embodiments, the sense board 516 may have sensors configured to measure the temperature of a battery cell. In some embodiments, sense board 516 may have one or more resistance thermometers. Sense board 516 may include, without limitation, a resistance temperature detector, thermocouple, thermistor, thermometer, or other type of temperature sensor. Sense board 516 may include a sensing element that may be made from a metal whose electric resistance increases with increasing temperature. In some embodiments, sense board 516 may include a metal with an electric resistance that quadratically increases with increasing temperature. Sense board 516 may include a negative temperature coefficient ("NTC") thermistor. A NTC thermistor may have a resistance that may decrease with increasing temperature. In some embodiments, a NTC thermistor may include a bead, disk, chip, glass encapsulated, or other NTC thermistor. In some embodiments, sense board 516 may include platinum, nickel, copper, palladium, indium, germanium, or other elements. Sense board 516 may include one or more sensing wires. In some embodiments, sensing wires may be made from a metal. In some embodiments, sense board 516 may include a sensing wire that may be 0.05 mm thick. In other embodiments, sense board 508 may have a sensing wire that may be greater or less than 0.05 mm thick. In some embodiments, the sense board 508 may be secured to a single side of electrical bridging device 508. In some embodiments, sense board 508 may be secured to two or more sides of electrical bridging device 508. In some embodiments, sense board 516 may be configured to relay temperature data to an external computing device. In some embodiments, sense board 516 may be configured to relay temperature data to an external computing device wirelessly. In other embodiments, sense board 516 may be configured to relay temperature data to an external computing device via a wired connection.

In some embodiments, and still referring to FIG. 5, sense board 516 may include one or more circuits and/or circuit elements, including without limitation a printed circuit board component, aligned with a first side of electrical bridging device 508. Sense board 516 may include, without limitation, a control circuit, which may include any analog or digital control circuit, including without limitation a combinational and/or synchronous logic circuit, a processor, microprocessor, microcontroller, or the like. Sense board 516 may include other sensors configured to measure physical and/or electrical parameters, such as without limitation temperature and/or voltage, of one or more battery cells. Sense board 516 and/or a control circuit incorporated therein and/or communicatively connected thereto, may further be configured to detect failure within a battery cell of battery packs 504A-B, for instance and without limitation as a function of and/or using detected physical and/or electrical parameters. Cell failure may be characterized by a spike in temperature. Sense board 516 may be configured to detect the spike in temperature and generate signals, which are discussed further below, to notify users, support personnel, safety personnel, maintainers, operators, emergency personnel, aircraft computers, or a combination thereof. Sense board 508 may include passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Heat energy is, at its core, the measure of kinetic energy of matter present within a system. Temperature, as measured by any number or combinations of sensors present on sense board 516, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Alternatively or additionally, and with continued reference to FIG. 5, sense board 508 may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like.

With continued reference to FIG. 5, sense board 516 and/or a control circuit incorporated therein and/or communicatively connected thereto may be configured to adjust charge to one or more battery cells as a function of a charge level and/or a detected parameter. For instance, and without limitation, sense board 516 may be configured to determine that a charge level of a battery cell is high based on a detected voltage level of that battery cell. Sense board 516 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. In some embodiments, sense board 516 may be configured to detect swelling of a pouch of a battery cell.

Figure 6:
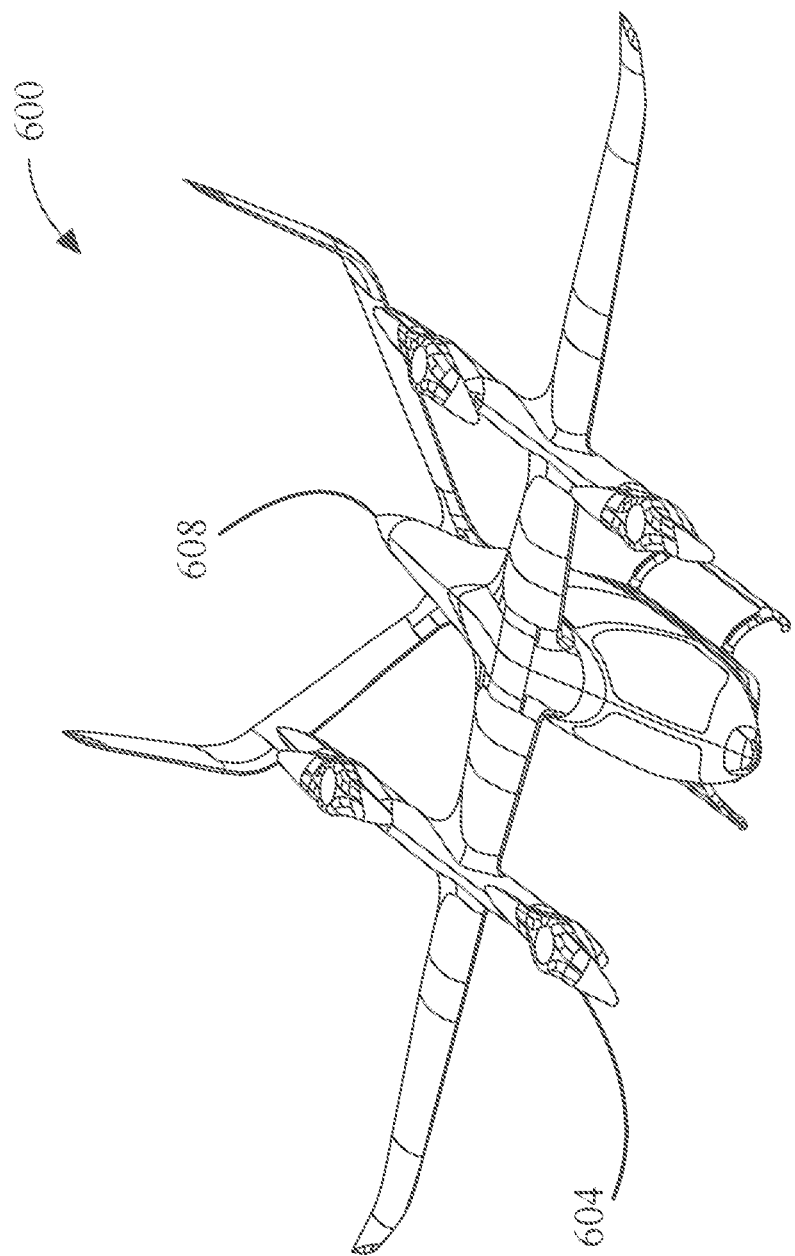
FIG. 6 is a front view of an exemplary embodiment of an electric aircraft.

Referring now to FIG. 6, an illustration of an exemplary embodiment of an electric aircraft 600 is shown. Battery assembly 400 as described above may power at least a portion of electric aircraft 600. In some embodiments, battery assembly 500 may be positioned inside electric aircraft 600. Electric aircraft 600 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of an electric aircraft 600, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Referring still to FIG. 6, Aircraft may include at least a vertical propulsor 604 and at least a forward propulsor 608. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 604 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 6, at least a forward propulsor 608 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 604 and at least a forward propulsor 608 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 6, during flight, a number of forces may act upon the electric aircraft. Forces acting on an aircraft 600 during flight may include thrust, the forward force produced by the rotating element of the aircraft 600 and acts parallel to the longitudinal axis. Drag may be defined as a rearward retarding force which is caused by disruption of airflow by any protruding surface of the aircraft 600 such as, without limitation, the wing, rotor, and fuselage. Drag may oppose thrust and acts rearward parallel to the relative wind. Another force acting on aircraft 600 may include weight, which may include a combined load of the aircraft 600 itself, crew, baggage and fuel. Weight may pull aircraft 600 downward due to the force of gravity. An additional force acting on aircraft 600 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
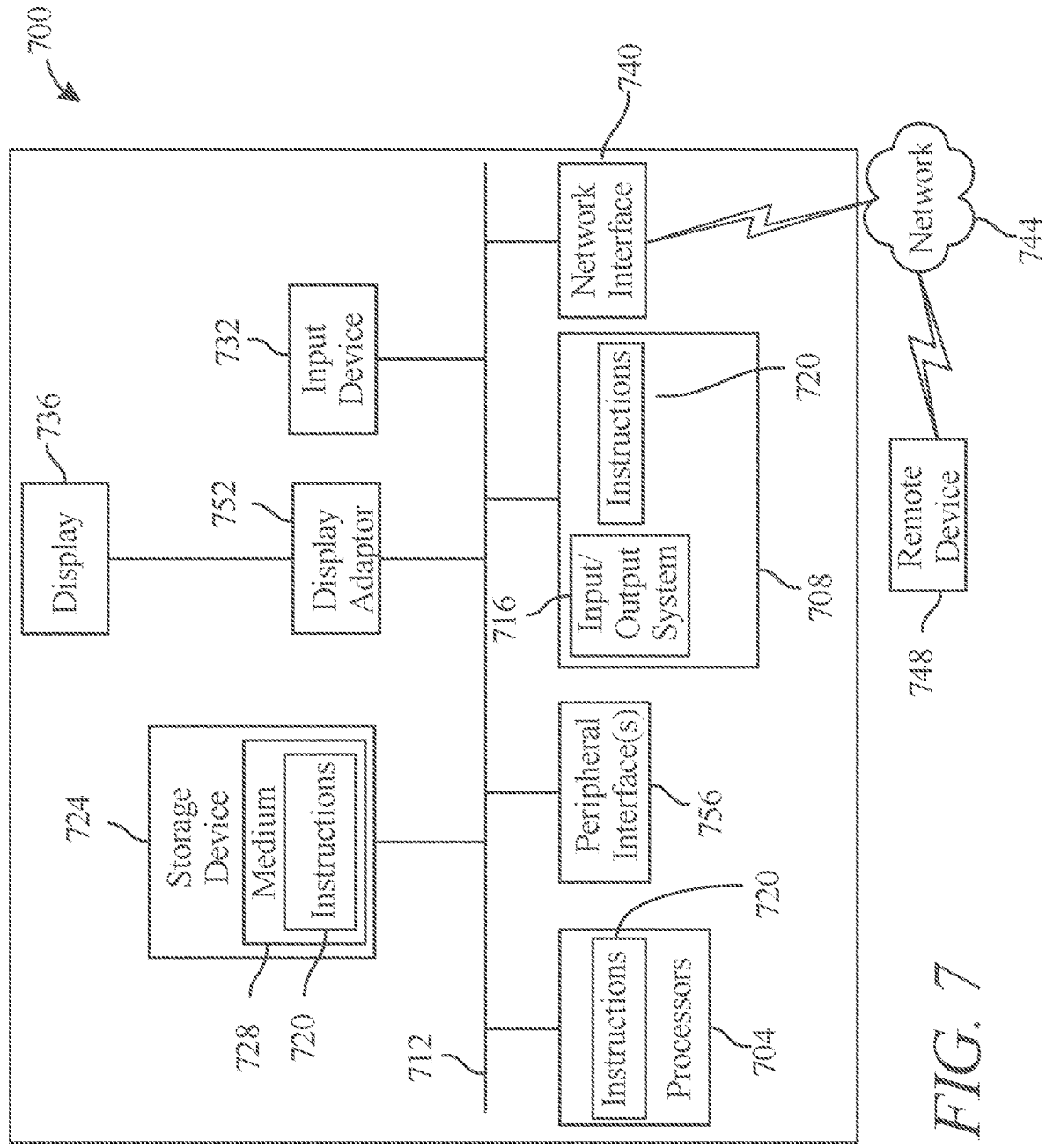
FIG. 7 is a block diagram of an exemplary embodiment of a computing system.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery assembly, wherein the battery assembly comprises:
    a plurality of first battery cells;
    a plurality of second battery cells; and
    an electrical bridging device disposed between the plurality of first battery cells and the plurality second battery cells, wherein a top of each first battery cell of the plurality of first battery cells is coupled to a first side of the electrical bridging device, and a top of each second battery cell of the plurality of second battery cells is coupled to a second side of the electrical bridging device, wherein the electrical bridging device comprises:
        a sense board, wherein the sense board is configured to detect cell failure of a battery cell of the battery assembly, wherein the sense board comprises a gas sensor configured to detect a gaseous discharge emitted from the battery cell that is indicative of cell failure; and
        at least a shunt configured to create a low resistance path for an electric current to prevent a current overload of the battery assembly;
    a cooling element disposed between the plurality of first battery cells and the plurality of second battery cells, wherein the cooling element comprises a cold plate including a plurality of holes.

2. The battery assembly of claim 1, wherein the battery assembly is disposed within an aircraft, wherein the aircraft includes an electric vertical takeoff and landing aircraft.

3. The battery assembly of claim 1, wherein each first battery cell of the plurality of first battery cells and each second battery cell of the plurality of second battery cells include a pouch cell.

4. The battery assembly of claim 1, wherein each first battery cell of the plurality of first battery cells and each second battery cell of the plurality of battery cells includes a lithium-ion battery.

5. The battery assembly of claim 1, wherein each first battery cell of the plurality of first battery cells and each second battery cell of the plurality of second battery cells includes a flexible casing.

6. The battery assembly of claim 1, wherein each first battery cell of the plurality first battery cells and each second battery cell of the plurality of second battery cells includes a conductive foil tab.

7. The battery assembly of claim 6, wherein the conductive foil tab is configured to:
    carry a positive terminal to an outside portion of the plurality of first battery cells and an outside portion of the plurality of second battery cells; and
    carry a negative terminal to an outside portion of the plurality of first battery cells and an outside portion of the plurality of second battery cells.

8. The battery assembly of claim 1, wherein the electrical bridging device comprises a controller area network bus.

9. The battery assembly of claim 1, wherein the electrical bridging device is configured to transmit an electrical current.

10. The battery assembly of claim 1, wherein the electrical bridging device is configured to transmit a signal.

11. The battery assembly of claim 1, wherein the cooling element is configured to reduce a temperature of the battery assembly.

12. The battery assembly of claim 1, wherein the cooling element includes a pathway that allows a flow of a fluid.

13. The battery assembly of claim 1, wherein the cooling element includes a heat sink.

14. The battery assembly of claim 1, wherein the electrical bridging device further comprises a central processing unit.

15. The battery assembly of claim 1, wherein the electrical bridging device further comprises a controller.

16. The battery assembly of claim 1, wherein the electrical bridging device further comprises a transceiver.

17. The battery assembly of claim 1, wherein the electrical bridging device is configured to communicate data to another electrical bridging device.

18. The battery assembly of claim 1, wherein the electrical bridging device is configured to limit a current between the first plurality of battery cells and the second plurality of battery cells.

19. The battery assembly of claim 1, wherein the electrical bridging device is configured to detect a temperature of the battery assembly.

* * * * *